United States Patent
Mihan et al.

(12)

(10) Patent No.: US 6,860,929 B2
(45) Date of Patent: *Mar. 1, 2005

(54) PRINTING INKS AND LACQUERS CONTAINING POLYOLEFIN WAXES

(75) Inventors: Shahram Mihan, Ludwigshafen (DE); Andreas Deckers, Flomborn (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 4 days.

This patent is subject to a terminal disclaimer.

(21) Appl. No.: 10/311,375

(22) PCT Filed: Jun. 15, 2001

(86) PCT No.: PCT/EP01/06824

§ 371 (c)(1),
(2), (4) Date: Dec. 16, 2002

(87) PCT Pub. No.: WO01/98416

PCT Pub. Date: Dec. 27, 2001

(65) Prior Publication Data

US 2004/0035321 A1 Feb. 26, 2004

(30) Foreign Application Priority Data

Jun. 20, 2000 (DE) ......................... 100 29 324

(51) Int. Cl.$^7$ .............................. C09D 11/12
(52) U.S. Cl. .................. 106/31.29; 106/31.61
(58) Field of Search .............. 106/31.29, 31.61; 585/10; 526/160, 161, 169, 169.1, 169.2, 172; 502/103; 427/466

(56) References Cited

U.S. PATENT DOCUMENTS

| 5,750,813 | A | * | 5/1998 | Hess et al. ................... 585/12 |
| 6,080,902 | A | * | 6/2000 | Herrmann et al. ........... 585/512 |
| 6,143,846 | A | * | 11/2000 | Herrmann et al. ........... 526/170 |
| 6,166,161 | A | * | 12/2000 | Mullins et al. .............. 526/346 |
| 6,407,189 | B1 | * | 6/2002 | Herrmann .................. 526/160 |
| 6,506,856 | B2 | * | 1/2003 | Manders et al. .............. 526/91 |
| 2003/0019400 | A1 | * | 1/2003 | Deckers et al. ............. 106/502 |
| 2003/0114603 | A1 | * | 6/2003 | Mihan et al. ............. 525/333.8 |
| 2004/0007158 | A1 | * | 1/2004 | Mihan et al. ............... 106/271 |

FOREIGN PATENT DOCUMENTS

| CA | 1103694 | | 2/1994 |
| GB | 1056175 | | 1/1967 |
| WO | WO 01/98377 | * | 12/2001 |
| WO | WO 01/98379 | * | 12/2001 |
| WO | WO 01/98415 | * | 12/2001 |

OTHER PUBLICATIONS

Translation of Ullmann's Ency.der techn. Chemie, "Wachse", Bd. 24, age 36rr, 1997, no month available.

* cited by examiner

*Primary Examiner*—Helene Klemanski
(74) *Attorney, Agent, or Firm*—Keil & Weinkauf

(57) ABSTRACT

Printing inks and paints comprising a polyolefin wax component prepared from one or more olefins by catalysis using a single-site catalyst based on a complex of a transition metal from groups 5 to 8 of the Periodic System of the Elements, which comprises not more than one cyclopentadienyl system per transition metal.

8 Claims, No Drawings

PRINTING INKS AND LACQUERS CONTAINING POLYOLEFIN WAXES

The present invention relates to printing inks and paints comprising a polyolefin wax component prepared from one or more olefins by catalysis using a single-site catalyst based on a complex of a transition metal from groups 5 to 8 of the Periodic System of the Elements, which comprises not more than one cyclopentadienyl system per transition metal. The present invention further relates to micronized particles of polyolefin waxes for use in the printing inks and paints of the invention, to a process for preparing printing inks and paints using the micronized polyolefin wax particles of the invention, and to a method of printing paper or cardboard using the printing inks of the invention.

Paints and printing inks are composed of a plurality of constituents.

The four principal constituents of printing inks are:

colorants, usually synthetic organic or inorganic pigments; examples are
  inorganic pigments such as $TiO_2$, iron blue pigments or iron oxide pigments;
  metal pigments such as bronzes, an example being aluminum powder ("silver bronze"), brass powder ("gold bronze") or copper powder ("copper bronze");
  interference pigments, e.g., mother of pearl, pearl lustre;
  pigmentary carbon black;
  organic azo pigments, isoindoline pigments, phthalocyanine pigments or luminescent pigments;

fillers, examples being calcium carbonate, aluminum oxide hydrate, barium sulfate, silica, aluminum silicate (kaolin) or magnesium silicate (talc);

binders, selected from fatty, oxidatively drying or non-drying oils and—prepared from them—alkyd resins or solutions of resins;

solvents, such as water.

Furthermore, auxiliaries are incorporated as secondary constituents, examples being waxes, fatty acid amides, plasticizers, siccatives, and drying retardants.

Toners for copiers may be defined as special printing inks, comprising waxes not as a secondary constituent but instead as a principal component.

The effects of waxes in printing inks and paints are several:

they increase the abrasion, scratch and scuff resistance, i.e., the mechanical properties of printed products;

in liquid paints, they act as rheological additives; i.e., they may support the alignment of pigments, especially effect pigments, and may control the settling behavior of pigments and fillers;

they may hydrophobicize the surfaces and so enhance the dirt repellence;

they increase the lubricity of the printed surfaces and thus the mechanical stability; for example, they reduce the formation of metal marking tracks;

they increase the thermal load-bearing capacity; they can be used to achieve dulling effects, by means of which it is possible to improve, for example, the readability of printed products even-under adverse light conditions (mirror effects).

So that waxes have the optimum morphology for paints and printing inks, they are preferably micronized, i.e., brought to the correct morphology by grinding, spraying or (in the case of nonpolyethylene waxes) by bead polymerization, by means of the chosen polymerization technique. Micronized waxes are understood, accordingly, to be wax powders having a maximum particle diameter of 30 μm.

It is important for the waxes used to possess a certain floating capacity, since this is prerequisite for optimum formation of slip, release and protective coats.

It is also a function of the waxes used to prevent the formation of large pigment agglomerates during the formulation process. Moreover, it is desirable to separate any agglomerated pigments formed beforehand and to split them into what are known as the primary particles. Finally, the primary particles should also remain separate after the formulation process and should not undergo reaggregation on cooling.

To this end, a number of requirements are imposed on the wax. One of these requirements concerns the viscosity of the melt. The melt viscosity should be as low as possible so that during the formulation, which usually takes place by mixing at a temperature above the melting temperature of the wax, the melted wax is able to penetrate effectively through the cavities within the pigment agglomerates. As a result of the shear forces exerted in this way, the splitting of the agglomerates into the primary particles takes place more readily.

The wetting ability of the waxes should also be good.

In principle, natural and synthetic waxes may be used. The most suitable waxes are polyolefin waxes. These may be obtained either by free-radical polymerization of ethylene by the high pressure process (cf. *Ullmann's Encyclopädie der technischen Chemie*, 4th Edition, entry: Waxes, Vol. 24, p. 36 ff., Thieme Verlag Stuttgart, 1977) or by Ziegler-Natta polymerization of ethylene or propylene (DE-A 15 20 914, EP-A 584 586). These methods allow polyolefin waxes to be obtained having a broad molecular weight distribution and irregular incorporation of comonomers. The low molecular mass fractions which are present in these products lead in most cases to reduced hardness of the finished paints or printing inks.

EP-A 890 619 discloses the use of waxes, preferably polyethylene waxes, obtained by metallocene catalysis. They improve the hardness of the printing inks and paints prepared using them. For practical purposes, however, a further improvement is desirable. It is an object of the present invention to provide such an improvement.

We have found that this object is achieved in that waxes prepared with the aid of a complex of the formula I a to c are especially suitable as additives in printing inks and paints.

Waxes preparable with the aid of such single-site catalysts of a transition metal from groups 5 to 8 of the Periodic System which comprise not more than one cyclopentadienyl system per transition metal atom are known per se. The transition metal complexes required for this purpose comprise compounds of the formula I a to c.

In formula I a

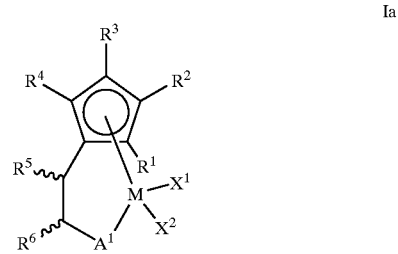

the variables are defined as follows:

M is an element from the group consisting of V, Nb, Ta, Cr, Mo, W, Mn, Fe in oxidation state +3; preferably V, Cr or Mo, and with particular preference Cr;

$X^1$, $X^2$ are selected from halogen such as fluorine, chlorine, bromine or iodine, chlorine and bromine being particularly preferred;

trifluoroacetate, $BF_4^-$, $PF_6^-$ or $SbF_6^-$, $C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl and n-butyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred, $C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy, or $NR^8R^9$, where $R^8$ and $R^9$ independently of one another are selected from hydrogen, $C_1$–$C_{12}$ alkyl, $C_2$–$C_{12}$ alkenyl and $C_6$–$C_{14}$ aryl, which are able to form a saturated or unsaturated 5- to 10-membered ring; preference is given to the dimethylamino, the diethylamino, the diisopropylamino, the methylphenylamino and the diphenylamino groups. Examples of amino groups containing saturated rings are the N-piperidyl group and the N-pyrrolidinyl group; examples of amino groups containing unsaturated rings are the N-pyrryl group, the N-indolyl group and the N-carbazolyl group.

Preferably, $X^1$ and $X^2$ are identical; with very particular preference, $X^1$ and $X^2$ are chlorine.

$R^1$ to $R^6$ independently of one another are hydrogen, halogen such as fluorine, chlorine, bromine or iodine, preference being given to chlorine and bromine;

$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-Decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, $C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{10}R^{11}R^{12}$, where $R^{10}$ to $R^{12}$ independently of one another are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{10}R^{11}R^{12}$, where $R^{10}$ to $R^{12}$ are selected independently of one another from hydrogen, $C_1$–$C_{1-2}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above;

A$^1$ is O—R$^{13}$, S—R$^{13}$, N(R$^{13}$)$_2$ or P(R$^{13}$)$_2$, R$^{13}$ being selected from halogen, C$_1$–C$_{12}$ alkyl, C$_2$–C$_{12}$-alkenyl, C$_3$–C$_{12}$-cycloalkyl, substituted or unsubstituted C$_6$–C$_{14}$ aryl groups or C$_1$–C$_{12}$ alkoxy groups, these groups being as defined for R$^1$ to R$^6$.

In one particular embodiment of the present invention, two adjacent radicals may together, with incorporation of the parent aromatic, form a 5- to 10-membered ring. For example, in formula I a, R$^3$ and R$^4$ together may be: —(CH$_2$)$_3$— (trimethylene), —(CH$_2$)$_4$—(tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH(C$_6$H$_5$)—O—, —O—CH$_2$—CH$_2$—O—, —O—C(CH$_3$)$_2$—O—, —NCH$_3$—CH$_2$—CH$_2$—NCH$_3$—, —NCH$_3$—CH$_2$—NCH$_3$— or —O—Si(CH$_3$)$_2$—O—.

In another embodiment of the present invention, compounds of the formula I b are used as catalytically active components.

In formula I b, the variables are defined as follows:

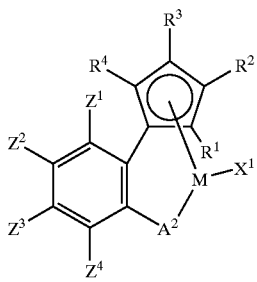

Ib

Z$^1$ to Z$^4$ independently of one another are
hydrogen,
halogen such as fluorine, chlorine, bromine or iodine, preference being given to chlorine and bromine;
C$_1$–C$_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably C$_1$–C$_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference C$_1$–C$_4$ alkyl such as methyl, ethyl, n-propyl, iso-propyl, n-butyl, iso-butyl, sec-butyl and tert-butyl,
C$_1$–C$_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;
mono- or polyhalogenated C$_1$–C$_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, with particular preference fluoromethyl, difluoromethyl, trifluoromethyl and perfluorobutyl;
C$_2$–C$_{12}$ alkenyl, preferably C$_2$ to (O—C$_8$ alkenyl such as vinyl, allyl, but-3-en-1-yl, ω-pentenyl, ω-hexenyl, ω-heptenyl, and ω-octenyl;
C$_3$–C$_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
C$_7$ to C$_{20}$ aralkyl, preferably C$_7$ to C$_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl,
C$_6$–C$_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl,
silyl SiR$^{10}$R$^{11}$R$^{12}$, where R$^{10}$ to R$^{12}$ independently of one another are selected from hydrogen, C$_1$–C$_{12}$ alkyl, C$_7$–C$_{15}$ aralkyl and C$_6$–C$_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;
siloxy OSiR$^{10}$R$^{11}$R$^{12}$, where R$^{10}$ to R$^{12}$ independently of one another are selected from hydrogen, C$_1$–C$_{12}$ alkyl, C$_7$–C$_{15}$ aralkyl and C$_6$–C$_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;
C$_1$–C$_{12}$ alkoxy, preferably C$_1$–C$_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;
C$_6$–C$_{14}$ aryl, substituted in turn by one or more C$_1$–C$_{12}$ alkyl, C$_1$–C$_{12}$ alkenyl, C$_3$–C$_{12}$ cycloalkyl, C$_6$–C$_{14}$ aryl, silyl SiR$^{10}$R$^{11}$R$^{12}$, siloxy OSiR$^{10}$R$^{11}$R$^{12}$ or C$_1$–C$_{12}$ alkoxy groups specified as above.
A$^2$ is selected from oxygen, sulfur, N–R$^{13}$ and P–R$^{13}$, preferably N–R$^{13}$ or P–R$^{13}$, where R$^{13}$ is as specified above.

In one particular embodiment of the present invention, two adjacent radicals may together with one another and including the parent aromatic form a 5- to 10-membered ring. Thus in formula I b, for example, R$^3$ and R$^4$ or Z$^1$ and Z$^2$ together may be: —(CH$_2$)$_3$— (trimethylene), —(CH$_2$)$_4$— (tetramethylene), —(CH$_2$)$_5$— (pentamethylene), —(CH$_2$)$_6$— (hexamethylene), —CH$_2$—CH=CH—, —CH$_2$—CH=CH—CH$_2$—, —CH=CH—CH=CH—, —O—CH$_2$—O—, —O—CH(CH$_3$)—O—, —O—CH—(C$_6$H$_5$)—O—, —O—CH$_2$—CH$_2$—O—, —O—C(CH$_3$)$_2$—O—, —NCH$_3$CH$_2$—CH$_2$—NCH$_3$—, —NCH$_3$—CH$_2$—NCH$_3$— or —O—Si(CH$_3$)$_2$—O—.

In a further particular embodiment, Z$^4$ and A may together with one another and including the phenyl ring in formula I b form a 5- to 10-membered ring. In a preferred embodiment, Z$^4$ and A form, with inclusion of the phenyl ring, an indol system.

The other variables R$^1$ to R$^4$, M, X$^1$ and X$^2$ are as defined for formula I a.

In formula I c

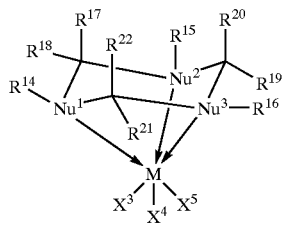

the variables are defined as follows:

X³, X⁴ and X⁵ independently of one another are
halogen such as fluorine, chlorine, bromine or iodine, chlorine and bromine being particularly preferred;
trifluoroacetate,
$BF_4^-$, $PF_6^-$ or $SbF_6^-$,
$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl and n-butyl;
$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred,
$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl,
$C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;
$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy, or
$NR^8R^9$, where $R^8$ and $R^9$ independently of one another are selected from hydrogen, $C_1$–$C_{12}$ alkyl, $C_2$–$C_{12}$ alkenyl and $C_6$–$C_{14}$ aryl, which are able to form a saturated or unsaturated 5- to 10-membered ring; preference is given to the dimethylamino, the diethylamino, the diisopropylamino, the methylphenylamino and the diphenylamino groups. Examples of amino groups containing saturated rings are the N-piperidyl group and the N-pyrrolidinyl group; examples of amino groups containing unsaturated rings are the N-pyrryl group, the N-indolyl group and the N-carbazolyl group.
Preferably, X³ to X⁵ are identical; with very particular preference, X³ to X⁵ are chlorine.
Nu¹ to Nu³ are selected independently of one another from N or P; preferably, Nu¹ and Nu² are each N, and with particular preference Nu¹ to Nu³ are each N.

R¹⁴ to R¹⁶ independently of one another are
hydrogen,
halogen such as fluorine, chlorine, bromine or iodine, preference being given to chlorine and bromine;
$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl,
$C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;
mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;
$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;
$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;
$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl,
$C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl,
silyl $SiR^{10}R^{11}R^{12}$, where $R^{10}$ to $R^{12}$ independently of one another are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;
siloxy $OSiR^{10}R^{11}R^{12}$, where $R^{10}$ to $R^{12}$ are selected independently of one another from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above.

Preferably, $R^{14}$ to $R^{16}$ are identical.

$R^{17}$ to $R^{22}$ independently of one another are hydrogen, $C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{10}R^{11}R^{12}$, where $R^{10}$ to $R^{12}$ independently of one another are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{10}R^{11}R^{12}$, where $R^{10}$ to $R^{12}$ are selected independently of one another from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_{1-2}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups specified as above.

Preferably, $R^{17}$, $R^{19}$ and $R^{21}$ are each identical, and preferably $R^{18}$, $R^{20}$ and $R^{22}$ are each hydrogen. With very particular preference, $R^{17}$ to $R^{22}$ are hydrogen. The triazacyclohexane ligands necessary for synthesizing these very particularly preferred compounds may be synthesized with particular ease.

In one particular embodiment of the formula I c, two adjacent radicals may together form a saturated or unsaturated 4- to 9-membered ring; for example, two radicals may together be: $C_3$–$C_9$ alkylidene such as, for example, —($CH_2$)$_3$— (trimethylene), —($CH_2$)$_4$— (tetramethylene), —($CH_2$)$_5$— (pentamethylene), —($CH_2$)$_6$— (hexamethylene), —$CH_2$—CH=CH—, —$CH_2$—CH=CH—$CH_2$—, —CH=CH—CH=CH—; and also cyclic aldols, ketals or amines such as, for example, —O—$CH_2$—O—, —O—CH($CH_3$)—O—, —O—CH—($C_6H_5$)—O—, —O—$CH_2$—$CH_2$—O—, —O—C($CH_3$)$_2$—O—, —N($CH_3$)—$CH_2$—$CH_2$—N($CH_3$)—, —N($CH_3$)—$CH_2$—N($CH_3$)—or —O—Si($CH_3$)$_2$—O—.

The other variables are as defined for formula I a.

In a further embodiment, the polyolefin wax is prepared by catalysis with a single-site catalyst based on a tripnicogen-cyclohexane complex of the formula Ic.

In a further embodiment, the polyolefin wax is prepared by catalysis with a single-site catalyst based on a 1,3,5-triazacyclohexane complex, a 1,3-diaza-5-phosphacyclohexane complex or a 1,3,5-triphospacyclohexane complex of the formula Ic.

The preparation of the transition metal complexes of the formula I a to c is known per se. Suitable syntheses for complexes of the formula I a and b can be found in DE-A 197 10 615, in A. Döhring et al., *Organometallics* 2000, 19, 388, and also in J. C. Weber, Dissertation, MPI Mulhouse/Ruhr, 1999.

The preparation of the particularly preferred triazacycloalkane ligands for complexes of the formula I c is known per se. Those for the synthesis of the very particularly preferred compounds of the formula I c where $R^{17}$ to $R^{22}$ are each hydrogen and the radicals $R^{14}$ to $R^{16}$ are each identical may be synthesized very effectively by mixing formaldehyde in the form, for example, of formalin solution with the associated amine $R^{14}$—$NH_2$. Various synthesis pathways for these complex ligands are described, for example, in F. Weitl et al., *J. Am. Chem. Soc.* 1979, 101 2728; M. Takahashi, S. Takamoto, *Bull. Chem. Soc. Japan* 1977, 50, 3413; T. Arishima et al., *Nippon Kagaku Kaishi* 1973, 1119; L.

Christiansen et al. *Inorg. Chem.* 1986, 25, 2813; L. R. Gahan et al., *Aust. J. Chem.* 1982, 35, 1119; B. A. Sayer et al., *Inorg. Chim. Acta,* 1983, 77, L63; K Wieghardt et al., *Z. Naturforsch.,* 1983, 38b, 81 and I. A. Fallis et al., *J. Chem. Soc., Chem. Commun.* 1998, 665.

The metal complexes, especially the chromium complexes, may be obtained in a simple manner by reacting the corresponding metal salts such as metal chlorides or metal carbonyls, for example, with the ligands, as for example in P. Chaudhuri, K. Wieghardt, *Prog. Inorg. Chem.* 1987, 35, 329 or G. P. Stahley et al., *Acta Crystall.* 1995, C51, 18.

In order that above complexes of the formulae I a to c are catalytically active, they are activated with a cation-forming compound. Suitable cation-forming compounds are selected aluminum or boron compounds having electron withdrawing radicals (e.g. trispentafluorophenylborane, trispentafluorophenylaluminum, N,N-dimethylanilinium tetrakispentafluorophenylborate, tri-n-butylammonium tetrakispentafluorophenylborate, N,N-dimethylanilinium tetrakis(3,5-bisperfluoromethyl)phenylborate, tri-n-butylammonium tetrakis(3,5-bisperfluoromethyl) phenylborate, and tritylium tetrakispentafluorophenylborate). These activators for complexes of the formulae I a to c are described in DE-A 199 35 407, in PCT/EP 0002716, and in Angew. Chem. Int. Ed., 1994, Vol. 33, p. 1877. Preference is given to dimethylanilinium tetrakispentafluorophenylborate, tritylium tetrakispentafluorophenylborate, and trispentafluorophenylborane.

Where boron or aluminum compounds are used as activators for the complexes of the formulae I a to c, they are generally employed in a molar ratio of from 1:10 to 10:1, based on M; preferably from 1:2 to 5:1 and with particular preference from 1:1.5 to 1.5:1.

Another suitable class of cation-forming compounds comprises the aluminoxanes of the formulae II a and b.

The structure of the aluminoxanes is not precisely known. They are products obtained by careful partial hydrolysis of aluminum alkyls (see DE-A 30 07 725). These products do not exist in pure form but are instead mixtures of open-chain and cyclic structures of type II a and b. These mixtures are presumed to exist in a dynamic equilibrium with one another.

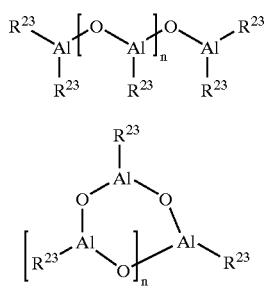

IIa

IIb

In formulae II a and b, the radicals $R^{23}$ independently of one another are $C_1$–$C_{12}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl; methyl is particularly preferred;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, or $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl; and n is an integer from 0 to 40, preferably from 1 to 25, and with particular preference from 2 to 22.

In the literature, cagelike structures are also discussed for aluminoxanes (Y. Koide, S. G. Bott, A. R. Barron *Organometallics* 1996, 15, 2213–26; A. R. Barron *Macromol. Symp.* 1995, 97, 15–25).

Irrespective of the actual structure of the aluminoxanes, they are suitable activators for complexes of transition metals of the formulae I a to c.

Mixtures of different aluminoxanes are particularly preferred activators in those cases where polymerization is conducted in a solution of a paraffin, n-heptane or isododecane, for example. One particularly preferred mixture is the CoMAO available commercially from Witco GmbH, having a formula of $[(CH_3)_{0.9}(iso-C_4H_9)_{0.1}AlO]_n$.

To activate the complexes of the formula I a to c with aluminoxanes, it is generally necessary to use an excess of aluminoxane, based on M. Sensible M:Al molar ratios are situated within the range from 1:10 to 1:10 000, preferably from 1:50 to 1:1000, and with particular preference from 1:100 to 1:500.

The chosen complex of the formulae I a to c and the cation-forming compound together form a catalyst system. By adding one or more further aluminum alkyl compounds of the formula $Al(R^{23})_3$ it is possible to increase further the activity of this catalyst system.

By adding further aluminum alkyl of the formula $Al(R^{23})_3$ or aluminoxanes it is possible to increase the activity of the catalyst system; aluminum alkyls of the formula $Al(R^{23})_3$ or aluminoxanes may also act as molecular mass regulators. Another effective molecular mass regulator is hydrogen. The molecular mass may be regulated with particular effect by the reaction temperature and the residence time.

Modern large-scale industrial preparation processes for polyolefin waxes are solution processes, suspension processes, bulk polymerization processes in liquid or supercritical monomer, and gas phase processes, the latter being either stirred gas phase or gas-phase fluidized bed processes.

In order that the complexes of the formulae I a to c may be used in suspension processes, bulk polymerization processes or gas phase processes, it is advantageous to immobilize them on a solid support. Otherwise, morphological problems of the polymer (crumbs, wall deposits, blockages in pipes or heat exchangers) may occur, forcing shutdown of the plant.

Catalyst systems comprising complexes of the formulae I a to c and activator may be effectively deposited on a solid support. Examples of suitable support materials are porous metal oxides, of metals from groups 2–14 or mixtures thereof, and also sheet silicates, and also solid halides of metals from groups 1, 2 and 13, and polymers such as, for example, polyethylene or polypropylene. Preferred examples of metal oxides from groups 2–14 are $SiO_2$, $B_2O_3$, $Al_2O_3$, MgO, CaO and ZnO. Preferred sheet silicates are montmorillonites or bentonites; preferred halides are $MgCl_2$ or amorphous $AlF_3$.

Particularly preferred support materials are spherical silica gels and alumosilicate gels of the formula $SiO_2 \cdot a\, Al_2O_3$, where a is generally a number in the range from 0 to 2, preferably from 0 to 0.5. Silica gels of this kind are available commercially, e.g., Silica Gel 332, Sylopol® 948 or Sylopol 952 or S 2101 from W. R. Grace or ES 70×from Crosfield.

Proven particle sizes for the support material comprise average particle diameters of 1–300 µm, preferably from 20 to 80 µm, the particle diameter being determined by means of known methods such as sieve methods. The pore volume of these supports is from 1.0 to 3.0 ml/g, preferably from 1.6 to 2.2 ml/g, and with particular preference from 1.7 to 1.9 ml/g. The BET surface area is from 200 to 750 $m^2/g$, preferably from 250 to 400 $m^2/g$.

In order to remove impurities, especially moisture, adhering to the support material, the support materials may be heated out prior to doping, suitable temperatures being from 45 to 1000° C. Temperatures of from 100 to 750° C. are particularly suitable for silica gels and other metal oxides; for $MgCl_2$ supports, temperature ranges from 50 to 100° C. are preferred. This heating out should take place over a period of from 0.5 to 24 hours, heatout times of from 1 to 12 hours being preferred. The pressure conditions are not critical per se; heating out may take place under atmospheric pressure. Advantageously, however, use is made of reduced pressures of from 0.1 to 500 mbar; a particularly advantageous range is from 1 to 100 mbar and a very particularly advantageous range from 2 to 20 mbar. Chemical pretreatment of the support material is another possibility.

The general procedure for doping the catalyst is to slurry the support material in a suspension medium and to combine this suspension with the solution of a complex of the formula I a to c and of the activator. The volume of the suspension medium is from 1 to 20 times the pore volume of the catalyst support. Subsequently, the catalyst may be separated from the suspension medium by means of an appropriate method, such as filtration, centrifugation or evaporation.

For better control of the morphology, the catalyst may be prepolymerized with small amounts of monomer prior to the polymerization proper. The prepolymerization can be terminated by adding a reversible catalyst poison or by ending the feed of monomer, and the prepolymerized catalyst may subsequently be added to the polymerization unit.

Suitable monomers include the following olefins: ethylene, propylene, 1-butene, 1-pentene, 1-hexene, 1-octene, 1-decene or 1-undecene, ethylene being particularly preferred.

Suitable comonomers include α-olefins, such as from 0.1 to 20 mol % of 1-butene, 1-pentene, 1-hexene, 4-methyl-1-pentene, 1-octene, 1-decene or 1-undecene. Isobutene, however, is also a suitable comonomer.

In order to prevent the electrostatic charging of the polymerization unit or of the product that is occasionally observed with polymerizations, an antistat may be added to the reaction mixture. Suitable antistats are dilute solutions of aliphatic alcohols, such as isopropanol, in paraffins such as n-heptane, for example. Further suitable antistats are available commercially as Stadis® products from DuPont.

In order to prepare the paints and printing inks of the invention, the wax, which in large-scale industrial plants is usually obtained in the form of a coarse powder, is micronized in a subsequent step. Micronization is carried out using mills, an example being air jet mills. As a result of micronization, the wax is obtained as what is known as micropowder, the maximum particle diameter not exceeding 30 µm and preferably not exceeding 25 µm.

The conventional principal constituents of the paint or printing ink of the invention, in the amounts prescribed by the formulation, are first of all mixed with the micronized wax in high-speed stirrers known as dissolvers. Subsequently they are mixed further, for example, in stirred ball mills with a friction gap, which have been charged with grinding beads having a diameter of from 0.05 to 5 mm, preferably from 0.5 to 2.5 mm, and with particular preference 2 mm. Thereafter, the paint or ink of the invention is passed optionally through a triple-roll mill in order to remove the oxygen incorporated by stirring. Alternatively, the printing ink may also be degassed by application of a vacuum.

The weight fraction of the wax in the printing inks and paints of the invention is from 0.05 to 65% by weight, preferably from 0.1 to 10% by weight, and with particular preference from 0.5 to 3% by weight. The weight fraction of the wax in the copier toners of the invention is, for example, from 45 to 65% by weight.

Further components of the printing inks of the invention are from 5 to 30% by weight of an organic or inorganic pigment, organic pigments being preferred; and also from 65 to 90% by weight of binder, comprising a resin and, optionally, one or more solvents such as ethanol, methanol, isopropanol, water, toluene or low molecular mass hydrocarbons, for example, and also optionally oils and antioxidants.

The printing inks of the invention are notable for particular mechanical stability, especially abrasion resistance, and for particular gloss. The printing inks are therefore suitable to be employed for pinting on paper or cardboard.

WORKING EXAMPLE

Preparation of the complex $(n\text{-}C_{12}H_{25}NCH_2)_3CrCl_3$ and polymerization of ethylene are described fundamentally in DE-A 199 35 407, in PCT/EP 0002716, and in Angew. Chem. Int. Ed. 1994, Vol. 33, p. 1877. The preparation of offset printing inks is described, for example, in the product brochure "Luwax® Poligen® Waxes and Dispersions—Use in Printing Inks", fundamentally, dating from 1992.

The scuff resistance was determined in a Prufbau-Quartant scuff tester, while for measuring the gloss a multiangle reflectometer "Multigloss" from Byk-Chemie was used.

In a 10 liter steel autoclave (from Buchi), 50 mg (67 mmol) of $(n\text{-}C_{12}H_{25}NCH_2)_3CrCl_3$, dissolved in toluene, were activated with 14 ml of 30% MAO from Witco, the Al:Cr ratio set being 1000:1. 4 l of isobutane and 80 l (3.8 mol) of hydrogen were injected, and the autoclave was then heated to 90° C. Subsequently, 40 bar of ethylene were injected and polymerization was conducted for 30 minutes, the pressure being maintained at 40 bar by adding further ethylene.

The polymerization was terminated by letting down the autoclave.

Yield: 460 g, corresponding to an activity of 14,000 kg of PE(mol Cr·h).

The wax thus obtained had the following properties: melting point 128.5° C.; $M_w$: 5200 g, $M_n$: 2100 g. $M_w/M_n$ = 2.5.

Number of vinyl and vinylidene double bonds/1000 carbon atoms: from 0.5 to 2.3.

The wax was micronized in an opposed-jet mill until it had a diameter of 9 μm (median), determined by laser diffraction using a Coulter counter.

Example 1

1.0% by weight of wax was dispersed in a hydrocarbon (toluene) and then incorporated into an offset printing ink Novaboard cyan 4 C 86 from K+E Druckfarben (wax-free), comprising 18% by weight organic pigment, 31% by weight rosin, 34% by weight glue resin and 16% by weight mineral oil.

For the comparative examples, the following waxes were incorporated analogously into the offset printing ink and tested.

V1: Luwax® AF 30, BASF Aktiengesellschaft, prepared by high-pressure polymerization
V2: Clariant Wachs PE 520® prepared by Ziegler-Natta catalysis
V3: Polyethylene wax, prepared by metallocene catalysis in accordance with EP-A 0 890 619, example 3

For testing the abrasion resistance, a sample print was made using a multipurpose test bed printing machine from Dr. Dürner on paper of type Phoenomatt 115 g/m² (Scheufelen GmbH & Co. KG). The scuffing behavior was investigated on a scuffing tester from Scheuerprüfer Prüfbau Quartett), setting a scuffing load of 48 g/cm² and a scuffing speed of 15 cm/s. Assessment was made of the intensity of the color transferred to the test sheet through a determination of the color difference in accordance with DIN 6174, a relatively low color difference value indicating advantageous properties.

TABLE 1

| | Results | |
|---|---|---|
| Experiment | Color difference after 200 strokes | Particle diameter $d_{50}$ [μm] |
| 1 | 1.9 | 8.9 |
| V1 | 3.9 | 8.7 |
| V2 | 3.2 | 9.1 |
| V3 | 2.2 | 9.0 |
| No wax | 15.9 | — |

We claim:

1. A printing ink or paint comprising a polyolefin wax component prepared from one or more olefins by catalysis with a single-site catalyst based on a complex of the formulae Ia to Ic,

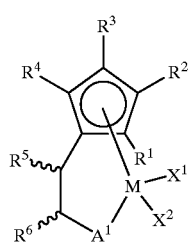

Ia

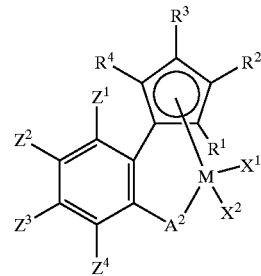

Ib

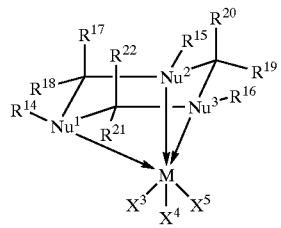

Ic where the variable are defined as follows:
M is an element selected from the group consisting of V, Nb, Ta, Cr, Mo, W, Mn and Fe in oxidation state +3;
$X^1$ to $X^5$ are selected from a group consisting of halogen, trifluoroacetate, $BF_4^-$, $PF_6^-$ or $SbF_6^-$, $C_1$–$C_{18}$ alkyl, $C_3$–$C_{12}$ cycloalkyl, $C_7$–$C_{20}$ aralkyl, $C_6$–$C_{14}$ aryl, $C_1$–$C_{12}$ alkoxy and $NR^8R^9$;
$R^8$ and $R^9$ are, independently of one another, hydrogen, $C_1$–$C_{12}$ alkyl, $C_2$–$C_{12}$ alkenyl or $C_6$–$C_{14}$ aryl, or form, together with the nitrogen to which they are bonded, a saturated or unsaturated 5- to 10-membered ring;
$R^1$ to $R^6$, and $Z^1$ to $Z^4$, are independently of one another selected from a group consisting of:
hydrogen;
halogen;
$C_1$–$C_{18}$ alkyl;
$C_1$–$C_{12}$ alkyl; substituted one or more times by donor atoms;
mono- or polyhalogenated $C_1$–$C_{12}$ alkyl groups;
$C_2$–$C_{12}$ alkenyl;
$C_3$–$C_{12}$ cycloalkyl;
$C_7$–$C_{20}$ aralkyl;
$C_6$–$C_{14}$ aryl;
silyl $SiR^{10}R^{11}R^{12}$;
siloxy $OSiR^{10}R^{11}R^{12}$;
$C_1$–$C_{12}$ alkoxy; and
$C_6$–$C_{14}$ aryl which is in turn substituted by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups;
and, in formulae Ia and Ib, two adjacent radicals $R^1$ to $R^6$, $Z^1$ to $Z^4$, $R^{14}$ to $R^{16}$ together with the ring to which they are bonded, may form a 5- to 10-membered ring;
$R^{17}$ to $R^{22}$ are independently of one another selected from a group consisting of:
hydrogen;
$C_1$–$C_{18}$ alkyl;
$C_1$–$C_{12}$ alkyl substituted one or more times by donor atoms;
mono- or polyhalogenated $C_1$–$C_{12}$ alkyl groups;
$C_2$–$C_{12}$ alkenyl;
$C_3$–$C_{12}$ cycloalkyl;
$C_7$–$C_{20}$ aralkyl;

$C_6$–$C_{14}$ aryl;

silyl $SiR^{10}R^{11}R^{12}$;

siloxy $OSiR^{10}R^{11}R^{12}$;

$C_1$–$C_{12}$ alkoxy; and $C_6$–$C_{14}$ aryl which is in turn substituted by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups;

and, in formula Ic, two adjacent radicals $R^{14}$ to $R^{22}$ may together form a saturated or unsaturated 4- to 9-membered ring;

$R^{10}$ to $R^{12}$ are independently of one another hydrogen, $C_1$–$C_{12}$ alkyl, $C_7$–$C_{15}$ aralkyl or $C_6$–$C_{14}$ aryl;

$A^1$ is $O-R^{13}$, $S-R^{13}$, $N-(R^{13})_2$ or $P-(R^{13})_2$;

$A^2$ is oxygen, sulfur, $N-R^{13}$ or $P-R^{13}$;

and, in formula Ib, $Z^4$ and $A^2$ together with the phenyl ring to which they are bonded, may form a 5- to 10-membered ring;

$R^{13}$ is halogen, $C_1$–$C_{12}$ alkyl which is optionally mono- or polysubstituted with donor atoms, mono- or polyhalogenated $C_1$–$C_{12}$ alkyl, $C_3$–$C_{12}$ cycloalkyl, $C_1$–$C_{12}$ alkoxy, or $C_6$–$C_{14}$ aryl which is optionally substituted by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{10}R^{11}R^{12}$, siloxy $OSiR^{10}R^{11}R^{12}$ or $C_1$–$C_{12}$ alkoxy groups;

$Nu^1$ to $Nu^3$ are each N or P.

2. A printing ink or paint as claimed in claim 1, wherein the polyolefin wax is prepared by catalysis with a single-site catalyst based on a tri-pnicogen-cyclohexane complex of the formula Ic.

3. A printing ink or paint as claimed in claim 1, wherein the polyolefin wax is prepared by catalysis with a single-site catalyst based on a 1,3,5-triazacyclohexane complex, a 1,3-diaza-5-phosphacyclohexane complex or a 1,3,5-triphosphacyclohexane complex of formula Ic.

4. A printing ink or paint as claimed in claim 1, wherein the polyolefin wax is prepared by catalysis with a single-site catalyst based on a Cr complex of the formula Ic.

5. A process for preparing the printing ink or paint defined in claim 1, which comprises adding micronized particles of the polyolefin wax component to a printing ink or paint.

6. A method of printing paper or cardboard, which comprises applying the printing ink in claim 1 to the paper or the cardboard.

7. The printing ink or paint defined in claim 1, wherein the polyolefin component is a polyethylene component.

8. The printing ink or paint defined in claim 1, wherein the polyolefin component is a homopolymer or is a copolymer of an olefin and from 0.1 to 20 mol-% of one or more comonomers selected from the group consisting of 1-butene, isobutene, 1-pentene, 1-hexene, 4-methyl-1-pentene, 1-octene, 1-decene and 1-undecene.

* * * * *